Dec. 25, 1956  W. L. ZINKE  2,775,443
CANTILEVER SPRING
Filed Jan. 28, 1955
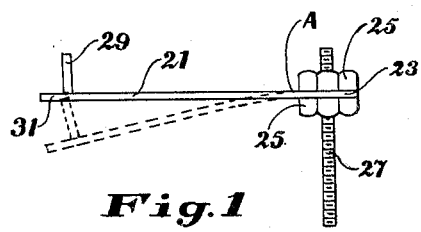
Fig.1
PRIOR ART
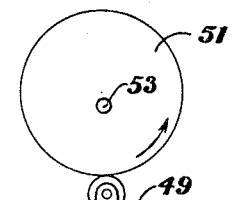
Fig.2
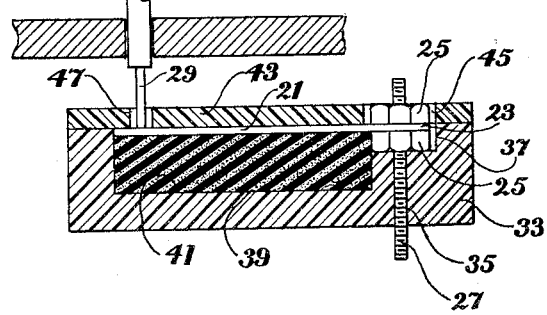
Fig.3
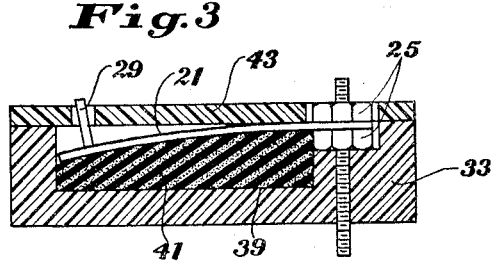
Fig.4
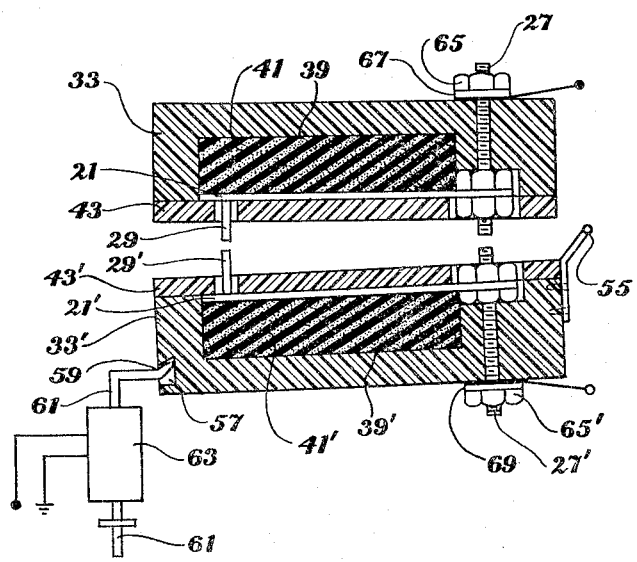
Willard L. Zinke
INVENTOR.
BY
ATTORNEYS

– – –

2,775,443

CANTILEVER SPRING

Willard L. Zinke, Rochester, N. Y., assignor, by mesne assignments, to the United States of America as represented by the Secretary of the Navy Application January 28, 1955, Serial No. 484,859

1 Claim. (Cl. 267—1)

This invention relates to a cantilever spring construction and more particularly to a cantilever spring provided with a compressible backing for retarding breakage failure of the spring resulting from repeated actuations of the same.

The known prior art cantilever mounted springs are all subject to breakage failure adjacent the fixed end thereof after repeated actuations, thus necessitating frequent replacement under such conditions of use. Even prior to the actual breakage failure of these springs according to the known prior art, the springs lose much of their resiliency after such repeated actuation and fail to adequately perform the intended function.

It is an object of the present invention, therefore, to provide a cantilever spring which resists breakage failure and loss of resiliency even after repeated actuations.

It is a further object of the present invention to provide a cantilever spring having a compressible backing of rubber, plastic or fluid material for retarding breakage failure of the spring resulting from repeated actuations.

Other objects and advantages of my invention will be apparent to those skilled in the art from the following description with reference to the drawing in which like characters denote like parts in which:

Fig. 1 illustrates a cantilever spring according to the known prior art;

Fig. 2 is a cross-sectional view illustrating my invention as utilized to maintain a cam and cam follower in peripheral contact;

Fig. 3 is a cross-sectional view illustrating the position taken by the cantilever spring according to my invention during actuation; and Fig. 4 is a cross-sectional view illustrating my invention as utilized in an electrical solenoid actuated switch.

In Fig. 1 is illustrated a simple cantilever spring 21 fixed at one end 23 between nuts 25 on threaded member 27 in accordance with the known prior art devices. When a force is applied downwardly on pin 29 fixed to end 31 of spring 21, said spring is depressed into a position approximating that shown by the dotted lines in Fig. 1. It will be noted that the most severe bending of the spring 21 occurs at point A where the stress in the spring is at the maximum. For this reason under repeated actuation the spring loses its resiliency and finally breaks off at point A immediately adjacent the fixed end 23.

In Fig. 2 is illustrated my invention and one use therefor. Spring 21 is fixed at one end 23 between nuts 25 on threaded member 27 as was described in regard to the known prior art device and Fig. 1. The spring 21 is mounted on a base member 33 provided with a bore 35 and counter bore 37 for receiving, respectively, the threaded member 27 and one of the mounting nuts 25. A rectangularly shaped cavity 39 is provided immediately beneath spring 21 within base member 33. Cavity 39 is preferably filled with rubber 41 which yieldably resists the deflection of spring 21 into cavity 39 and possesses the property of compressibility such, for example, as foam rubber or sponge rubber; however, a yieldable resilient plastic or fluid can be used, if desired, to perform substantially the same function although in the event that a fluid is utilized, it is necessary to provide fluid seals between the parts. A cover member 43 provided with a bore 45 for receiving the other one of the nuts 25 and an aperture 47 through which pin 29 protrudes, retains spring 21 and rubber 41 within cavity 39 in base member 33. Pin 29 supports cam follower 49 in contact with the periphery of cam 51 having its axis of rotation at 53.

The improved cantilever spring construction according to my invention is further illustrated in Fig. 3 in a position to which the spring 21 has been depressed by a force acting through pin 29 such as for example by the cam follower illustrated in Fig. 1. The rubber 41 contained in cavity 39 resists the depressing force exerted on spring 21 through pin 29 and as will be noted from Fig. 3, the bending of spring 21 is evenly distributed throughout the length of the spring from pin 29 to the nuts 25. The even distribution of the bending indicates an equal or substantially equal stress distribution in the spring 21. Since a stress concentration such as that described in regard to Fig. 1 and the known prior art does not exist, the spring is not subject to loss of resiliency and breakage failure even after repeated actuations. Needless to say, breakage failure of my improved cantilever spring construction does occur after a sufficient number of repeated actuations; however, the normal useful life of the spring according to my invention far exceeds that of the known prior art cantilever springs. Another distinct advantage of my improved cantilever spring construction exists in the fact that the force required for a given deflection for a given spring can be varied by merely substituting different hardnesses of yieldable rubber or plastic or a yieldable fluid in the cavity 39 of base member 33.

In Fig. 4 the cantilever spring construction according to my invention is effectively utilized in an electrical solenoid actuated switch. In this application two cantilever springs 21 and 21' mounted on base members 33 and 33' having cavities 39 and 39' filled with rubber 41 and 41' and provided with cover members 43 and 43' respectively are utilized. Base member 33 is fixed in position while base member 33' is provided with a hinge 55 permitting pivotal movement of base member 33' with respect to base member 33. A notch 57 is also provided in base member 33' for receiving the hook end 59 of the solenoid plunger 61 of solenoid 63. Nuts 65 and 65' secure circuit contacts 67 and 69 respectively to threaded members 27 and 27' protruding from base members 33 and 33'. Energizing solenoid 63 causes plunger 61 to move upwardly and thereby pivot base member 33' on hinge 55 upwardly toward base member 33. Contact of pins 29 and 29' completes the electrical circuit for contacts 67 and 69. Springs 21 and 21' are each deflected in the manner previously described with reference to Fig. 2 as a result of the continued upward movement of overtravel of base member 33' after contact of pins 29 and 29'.

While I have now described only one embodiment of my invention utilized in two different applications, it is realized that many modifications or variations are possible and will be readily recognized by those skilled in the art, and therefore the present disclosure is intended to be illustrative only, and the scope of the invention is defined by the appended claim.

Having now particularly described my invention, what I desire to secure by Letters Patent of the United States and what I claim is:

A device of the character described comprising a base provided with a cavity, a flat spring fixed at one end thereof to said base adjacent said cavity and deflectable at the other end thereof into and out of said cavity, and a resilient material filling said cavity beneath said spring for yieldably resisting deflection of said other end of said spring into said cavity, and a cover for said base and provided with an aperture, pin means attached on said other end of said spring and protruding upwardly through said aperture thereby permitting deflection of said end through said pin means from without said base.

References Cited in the file of this patent

UNITED STATES PATENTS

| | | |
|---|---|---|
| 1,792,876 | Stout | Feb. 17, 1931 |
| 1,850,259 | Bugatti | Mar. 22, 1932 |
| 2,172,678 | Heftler | Sept. 12, 1939 |
| 2,639,139 | Carlson | May 19, 1953 |